(12) United States Patent
DeWaard et al.

(10) Patent No.: US 10,683,239 B2
(45) Date of Patent: Jun. 16, 2020

(54) METHOD AND SYSTEM FOR COMPOUNDING FERTILIZER FROM MANURE WITHOUT NUTRIENT EMISSION

(71) Applicant: DariTech, Inc., Lyndan, WA (US)

(72) Inventors: David DeWaard, Lyndan, WA (US); Josh McCort, Lynden, WA (US); Michael Klapper, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 204 days.

(21) Appl. No.: 15/792,442

(22) Filed: Oct. 24, 2017

(65) Prior Publication Data
US 2019/0119174 A1    Apr. 25, 2019

(51) Int. Cl.
| | |
|---|---|
| C05F 3/00 | (2006.01) |
| C05C 3/00 | (2006.01) |
| C05F 3/06 | (2006.01) |
| C05F 17/00 | (2020.01) |
| C05F 17/90 | (2020.01) |
| B01D 1/28 | (2006.01) |
| C05F 17/20 | (2020.01) |
| C05F 17/964 | (2020.01) |

(52) U.S. Cl.
CPC ............... *C05C 3/00* (2013.01); *B01D 1/28* (2013.01); *C05F 3/00* (2013.01); *C05F 3/06* (2013.01); *C05F 17/00* (2013.01); *C05F 17/20* (2020.01); *C05F 17/90* (2020.01); *C05F 17/964* (2020.01)

(58) Field of Classification Search
None
See application file for complete search history.

(56) References Cited

U.S. PATENT DOCUMENTS

| | | | | |
|---|---|---|---|---|
| 4,668,250 | A | * | 5/1987 | Drese ................ B01D 19/0005 95/263 |
| 5,593,590 | A | * | 1/1997 | Steyskal .................. C05F 3/00 210/603 |
| 5,810,975 | A | * | 9/1998 | Bourdel ................ B01D 1/225 159/11.3 |
| 5,928,412 | A | * | 7/1999 | Bastholm ............. B01D 1/2818 422/170 |
| 6,368,849 | B1 | * | 4/2002 | Norddahl ............. C02F 3/2853 435/262 |

(Continued)

*Primary Examiner* — Wayne A Langel
(74) *Attorney, Agent, or Firm* — Williams Kastner & Gibbs PLLC; Mark Lawrence Lorbiecki

(57) ABSTRACT

To produce fertilizer, a system and method concentrates manure slurry in a mechanical vapor recompression evaporator ("MVR") having a heat exchanger. The MVR receives the manure slurry within a first side to evaporate ammonia laden-water vapor from the slurry, leaving a nutrient concentrate. A compressor raises the evaporated ammonia-laden water vapor to a higher energy state. Within a second side of the heat exchanger, the compressed water vapor conveys heat to the slurry. Ammonia-laden water condenses in the second side at a process temperature to be conveyed to an ammonia stripping tower where the ammonia-laden water is dispersed into ammonia-laden water droplets. In the tower, a flow of air is directed across a surface of the ammonia-laden water droplets, the process temperature having been selected to promote the escape of ammonia gas from the ammonia-laden water droplets, the flow of air provided to entrain ammonia gas in the flow.

10 Claims, 3 Drawing Sheets

(56) References Cited

U.S. PATENT DOCUMENTS

| | | | | |
|---|---|---|---|---|
| 6,513,580 | B1* | 2/2003 | Bourdel | B01D 1/227 165/120 |
| 6,623,546 | B1* | 9/2003 | Bourdel | B01D 53/1406 95/199 |
| 9,962,623 | B2* | 5/2018 | Zaher | B01D 3/002 |
| 2002/0158024 | A1* | 10/2002 | Van Slyke | C02F 9/00 210/696 |
| 2003/0057160 | A1* | 3/2003 | Williams | A01C 3/02 210/718 |
| 2012/0074058 | A1* | 3/2012 | Zeng | C05F 3/00 210/631 |
| 2013/0105398 | A1* | 5/2013 | Wennergreen | C02F 1/42 210/670 |
| 2014/0083919 | A1* | 3/2014 | Li | B01D 1/007 210/180 |
| 2014/0311889 | A1* | 10/2014 | Zaher | B01D 3/065 203/42 |
| 2015/0299056 | A1* | 10/2015 | Ingels | A61L 9/145 71/21 |
| 2016/0002131 | A1* | 1/2016 | Glasspool | B01D 1/28 203/18 |
| 2016/0102026 | A1* | 4/2016 | Hulls | C05F 3/00 71/9 |
| 2016/0176768 | A1* | 6/2016 | Norddahl | C12M 21/04 71/10 |
| 2017/0073598 | A1* | 3/2017 | Heimann | C10L 5/42 |

* cited by examiner

METHOD AND SYSTEM FOR COMPOUNDING FERTILIZER FROM MANURE WITHOUT NUTRIENT EMISSION

FIELD OF THE INVENTION

The invention resides in the field of manure management more specifically in the compounding of manure constituents to manufacture fertilizer.

BACKGROUND OF THE INVENTION

Manure management on large dairy farms has become a major issue due to air quality and water quality concerns arising from the release of excess nutrients such as nitrogen and phosphorus into the environment. Yet, the nutrients found in manure can be exploited as a valuable fertilizer for any farming operation as it has been used for centuries. The use of manure as fertilizer completes the cycle of nutrients wherein crops feed livestock and the livestock supplies nutrients to the crops.

In spite of the ready availability of manure in dairy operations, use of manure as fertilizer has generally declined on many farms over the past 50 years. This decline in use is due to: 1) farm specialization with increasing separation of crop and livestock production, 2) the cost of transporting manure (which is a bulky, relatively low analysis nutrient source relative to the delivered benefit), and 3) increased availability of high analysis synthetic fertilizers that usually provide a cheaper source per unit of nutrient than manure. Nonetheless, given the bioavailability of the conventionally analyzed nutrients in manure (as well as other nutrients occurring naturally in manure), the mounting demand for produce grown using organic fertilizers in recent years, and the greater awareness of benefits of nutrient conservation in manure-based fertilizer production, dairymen have renewed their interest in the use of manure as or as a component of organic fertilizers.

While manure (raw or composted) contains many nutrients for crop production (including micronutrients), manure is also a valuable source of organic matter for soil amendment. Using manure to increase the volume of organic matter in soil improves the soil's structure or tilth and, thereby: 1) increases the water-holding capacity of coarse-textured sandy soils; 2) improves drainage in fine-textured clay soils; 3) provides a source of slow release nutrients; 4) reduces wind and water erosion; and 5) promotes growth of earthworms and other beneficial soil organisms. Typically, most harvest-type crops suffer the return of only small amounts of crop residue to the soil, so manure, compost, and other organic amendments may be necessary to maintain organic matter levels in soil.

Applying dairy manure in conventional volumes, however, may not yield an ideally balanced nutrient blend in agricultural soils. Often raw dairy manure may not include sufficient levels of nitrogen, phosphate oxide, and potassium oxide (these are the three traditional numbers by which fertilizers are described) to adequately support optimal growth of crops. Where the presence of these three ingredients is too low, the exclusive use of manure to amend soil can lead to nutrient deficiency and, as a result, low crop yields. Properly balanced nutrient blends can enhance manure-based fertilizer to be more efficacious from both a production and environmental standpoint.

On the other hand, where additional synthetic fertilizer is used to enhance the presence of certain nutrients, application of that synthetic fertilizer might result in localized excesses nutrients, which can, in turn, lead to nitrate leaching, phosphorus runoff, accelerated eutrophication of lakes, and excessive vegetative growth of some crops. Thus, understanding how to optimally formulate a manure-based fertilizer is an important element of opportunity for any farming operation with livestock. What is desirable, is the optimal exploitation of manure to serve as a major source of nutrients for growing feed or for resale as agricultural fertilizer.

Unfortunately, the process of composting strips available nitrogen from raw manure; the resulting compost may be very valuable for its organic content though it is deficient of essential nitrogen driven off by the composting process. Fresh, non-composted, manure will generally have a higher nitrogen content than composted manure. So, while uncomposted manure is high in soluble forms of nitrogen, it may contain high numbers of viable weed seeds, which can infest a cultivated crop. In addition, various pathogens such as *E. coli* may be present in uncomposted manure which can cause illness to individuals eating fresh produce unless proper precautions are taken.

Drying with heat will kill weed seeds and pathogens in the manure. Drying has several benefits in the production of fertilizer. Drying manure to low moisture content reduces the volume and weight of the manure; and that reduction lowers transportation costs. Dried manure products can also be easier to handle and easier to apply uniformly to fields. Dried manure products are readily stored. These advantages are especially prevalent in those dried manures that have been processed and formed into pellets. But, that drying also requires an expensive expenditure of energy; that expense alters the economics of manure use.

The heat necessary to kill pathogens elevates manure temperatures to exceed 150 to 175° F. for at least one hour and ought also to be sufficient to reduce water content to 10 to 12% or less. Composting accomplishes this internal heating necessary to sterilize the manure by exploiting heat generated by microbial respiration. Thus, while either raw manure or composted manure can be sufficiently heated to sterilize it suitable for use as fertilizer, each manure is burdened by its own separate shortcomings. To retain at least some of nitrogen available in raw manure while gaining the benefits of composting the organic material in raw manure, some dairymen blend sterile composted manure with heat-dried uncomposted manure in selected proportions to the retain higher proportions of soluble (inorganic) nitrogen than is present in uncomposted mature, while gaining some of the advantages of stable compost.

Though blended manures will exploit available nitrogen in raw manure to give these blended products some of the desired characteristics. Unfortunately, the amount of heat drying of manure necessary to sterilize the raw manure therein also forces the volatilization of nitrogen in the form of ammonia. The release of ammonia will reduce the total nitrogen content available in the finished product. In addition, composted or partially composted material that has been dried at high temperature rather than going through a curing phase at ambient temperature in a compost process is also not as biologically active as mature compost. Merely dried manure lacks the disease suppressive properties inherent in some composts. This quality of disease suppression depends upon recolonization of the compost by disease suppressing organisms during the curing phase.

As may be apparent, none of these conventional methods of conditioning manure to produce an ideal fertilizer. What is needed in the art is a method and system for recovering nitrogen from manure, isolating compostable organic solids, and to recombine these in selected proportions to retain as well as many of the nutrients present in harvested raw manure. The need exists to recombine nutrients and organic solids in manure into fertilizer while removing water, inert organics and sand, to produce compact and efficacious fertilizer.

SUMMARY OF THE INVENTION

To produce fertilizer, a system and method concentrates manure slurry in a mechanical vapor recompression evaporator ("MVR") having a heat exchanger. The MVR receives the manure slurry within a first side of the heat exchanger to evaporate ammonia laden-water vapor from the slurry, leaving a nutrient concentrate. A compressor raises the evaporated ammonia-laden water vapor to a higher energy state. Within a second side of the heat exchanger, the compressed water vapor conveys heat to the slurry. Ammonia-laden water condenses in the second side at a process temperature to be conveyed to an ammonia stripping tower where the ammonia-laden water is dispersed into ammonia-laden water droplets. In the tower, a flow of air is directed across a surface of the ammonia-laden water droplets. The process temperature of the droplets having been selected to promote the escape of ammonia gas from those ammonia-laden water droplets. The provided flow of air is then used to entrain ammonia gas in the flow.

A particular synergy of operation is possible because of the thermal proximity the mechanical vapor recompressor and the ammonia stripping tower share. Condensate comprising ammonia-laden water leaves the MVR at a process temperature selected to encourage the liberation of ammonia gas from the ammonia-laden water leaving nearly pure water. Subjected to a mist of sulfuric acid, the ammonia entrained in a flow of air reacts to precipitate solid ammonium sulfate.

The manure slurry, concentrated by the evaporative release of the ammonia-laden water vapor, yields a nutrient concentrate to be a principal constituent of an efficacious fertilizer. This nutrient concentrate may, optionally, serve as feedstock for an in-vessel composter. In various embodiments of the invention, any of organic solids, nutrient concentrate or aerobic thermophilic microorganisms ("ATM"), may be added to the feedstock to augment the nutrient concentrate, thereby to produce various fertilizers in distinct formulations. Advantageously, because the MVR removes water while reclaiming all the nitrogen as ammonium sulfate, what little drying is necessary to condition the nutrient concentrate for composting does not volatilize any nitrogen. Even those other nutrients in the concentrate need only to be subjected to a much lesser degree of heat-induced drying so that no significant volume of nutrients are volatilized. The nutrient concentrate in its dried form remains potent and available to the soil in amendment.

Additionally, the separation steps retain all nitrogen as ammonium sulfate, all remaining nutrients are isolated and can be selectively added to organic solids to produce fertilizer. No excess nutrients escape to the environment, as each has economic value. The resulting fertilizers provide optimally bioavailable nitrogen and organic solids to enhance soil. In an optional embodiment of the invention, solids from either of primary or secondary separation of the manure slurry can be used to produce, by gasification, energy for dairy operations including those steps of the instant method, such as drying manure. In toto, the method and system, separates manure into constituent nutrient and organic fractions and, in optional embodiments, compounds the concentrated nutrients and organic solids into efficacious fertilizer.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
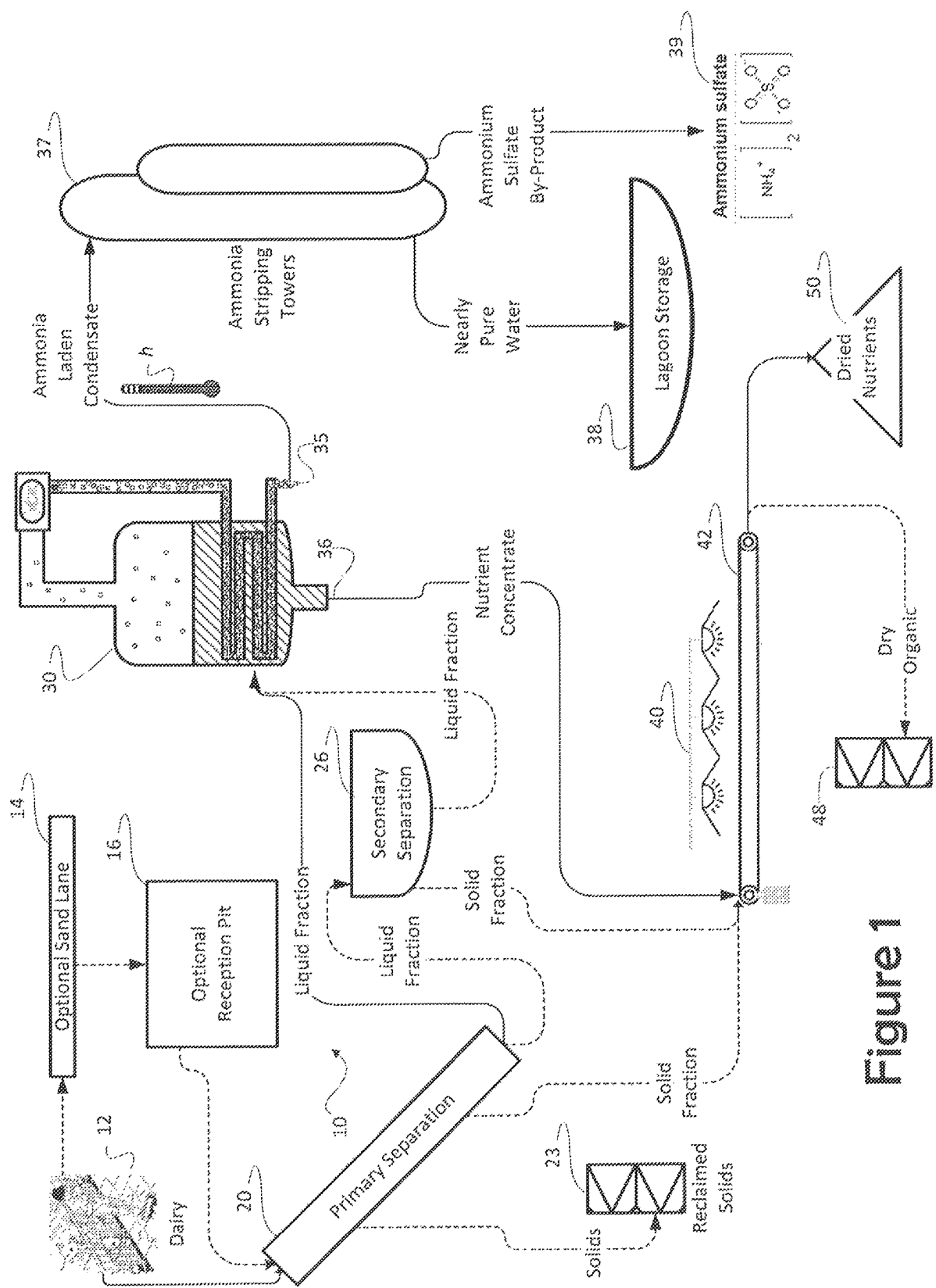
FIG. 1 depicts a method and system for separating nutrient concentrate, ammonium sulfate, and organic solids from manure.

A preferred embodiment of the invention is depicted in FIG. 1. A system 10 for extracting nutrients from raw manure is depicted as comprising a primary separator 20 and a mechanical vapor recompression ("MVR 30") operated in conjunction with an ammonia stripper feeding an ammonia concentrating stack in the preferred embodiment (referred to herein collectively as ammonia stripping towers 37). In the preferred embodiment, collected nutrient concentrate and reclaimed solids 23 and be suitably blended and composted to produce a variety of valuable fertilizers. In a presently preferred embodiment, the MVR 30 is specifically an evaporative-type MVR. Evaporation by mechanical vapor recompression requires lesser amounts of energy to achieve a concentration of nutrients in solution than might be used in conventional drying or by using the MVR 30 to distill rather than to evaporate the liquid fraction from separation.

Separation at an optional secondary separator 26 further removes suspended solids to present a more completely liquid fraction for concentrating downstream at the MVR 30. In this manner the exploitation of the optional secondary separator 26 improves the efficiency of the MVR 30. Because the suspended solids removed at the secondary separator 26 tend to be fibrous and non-nutritive particulate, removal of that particulate, like the removal of sand, assures that the remaining liquid after separation is much more completely useful in formulating fertilizer.

Importantly, just as with the removal of sand, primary separation seeks to remove inert organic matter such as cellulose from the final fertilizer product. Cows and other ruminants create an environment in their rumen which encourages microbial degradation, converting cellulose to volatile fatty acids and microbial biomass which the ruminant can then digest and use. Because of that digestion, cow feces do not contribute cellulose to the manure. But, cellulose such as that in straw, is not readily compostable. The removal of this inert solid particulate matter from the process assures that only high-value organic matter will be composted to ultimately compound fertilizer, thereby that the fertilizer products are uniformly effective and that each component of the compounded fertilizer contributes in a known quantity and in a known manner. The removal of sand and inert organics assures uniformity of the intended product and its conformance to the highest standards of quality in organic fertilizer.

Further advantages exist in the configuration of the instant invention. For example, process heat h from the MVR 30 is optionally used to optimize equilibrium in an ammonia stripping towers 37 to assure a maximum yield of ammonium sulfate for resale as fertilizer and to do so with the least expenditure of supplemental energy. Fresh water from the MVR 30, after being stripped of its ammonia content in the ammonia stripping stack 37 can be retained for use in the dairy, possibly by storing in a holding lagoon 38 for use as flush water.

Parenthetically, the inventors note, in a modern dairy, manure is moved by employing high volume manure pumps. Flow through these pumps is selected to occur at a flow rate adequate to prevent settling of manure solids as the manure is transported. While pumps are not portrayed in these FIGS. 1-3, the presence of those pumps is presumed. Because the movement of pumped manure within a dairy is well-known, depicting individual pumps is not necessary to convey an understanding of the invention. Pumps are not shown. Where conduits between elements of the system are portrayed, pumps might be employed to assure the movement of manure through those conduits in actual operation.

From the dairy 12, manure is conveyed as solids entrained in a flow of water. Dairy manure includes a complex mixture of two vastly different materials—water and undigested feed. In the instant invention, each of these constituent components is exploited to produce an effective fertilizer. However, sand adds no value but increases weight and volume of the resulting product. Some dairies use sand as bedding and, thus, in these dairies, the collected manure includes large volumes of sand. Even when sand is not used for bedding, cows will excrete sand from the feed they receive. Cows also track sand into the dairy. In typical embodiments, a gutter system in the dairy will direct manure to a primary separator 20. Because sand is generally the densest of the manure constituents, an optional sand lane 14 may employed to remove heavy sediment from the system before further processing.

Typical material proportions for manure from a dairy are such that in 170 lb. of manure having an approximately 40% solid content and a bulk density of about 72 lb./ft$^3$, 115 lb. will be raw manure having 15% solid content and a bulk density of 62 lb./ft$^3$, but that manure will be mixed with 55 lb. of sand at 95% solid content with a bulk density of 110 lb./ft$^3$. Given these exemplary proportions, what sand is held in suspension will not simply settle out of the manure but can float in suspension indefinitely. This suspended sand causes the manure to be highly abrasive when pumped. Removal of that sand may be achieved by flow through a sand lane 14 and a reception pit 16; and such use promotes the recovery of that sand bedding while removing abrasive from the handled manure.

The flow of manure through the sand lane 14 allows the less dense organic matter to flow over settling sand in the lane 14. The length of an exemplary lane 14 is selected based upon the size of the expected sand grains; longer lengths are needed for smaller sand grains. Often made of concrete, sand settling lanes 14 are only a few feet in depth, and a typical system will have two lanes to allow alternating use—one idle to provide for drainage and clean out, while the other lane is active to collect sand in use. The dairyman can clean out the idle lane with a front end loader without interrupting operation.

In the presently preferred embodiment, a conventional sand lane 14 receives flush water containing manure. The flow of water and manure is introduced into a shallow, long and narrow channel (lane) at a high delivery rate. An energy dissipation system is usually present at the head end of the lane to slow the velocity of the water and distribute that flow over a width of the sand lane 14. The bottom of the lane 14 in 12-foot-wide lanes, by way of example, conventionally will be sloped at between 0.2 to 0.25 percent. As a result, the flow of water and manure slows to 1 to 2 feet per second in the sand lane 14. The lower speed in the moving flow allows sand to settle out while rinsing most of the organic matter from the sand. The liquid manure with its organic matter continues through the sand lane 14 and may be retained in an optional reception pit 16. The reception pit 16 in the preferred embodiment sits at the lowest end of the sand lane 14, situated to collect manure from the dairy 12.

In the presently preferred embodiment shown, a feed pump (not shown) transfers the manure to further separation through a pipe to a primary separator 20. Primary separation may be through any conventional means, for example, by slope separator including a screen such as a wedge-wire screen, or by a rotary separator. Naturally, the purpose of the primary separator 20 is to remove as much of the remaining suspended solids from the manure as possible by the most economic means. Solids removed, for example, by wedge-wire screening need not later to be removed by the far more expensive use of a centrifuge and, thus, preliminary removal has great and positive impact on the economics of manure handling.

One type of primary separator 20 might be selected from any of the family of screen separators (stationary, vibrating, and rotating screen separators). Stationary screens are typically mounted on an incline. The raw liquid manure slurry is pumped to the top edge of the screen and allowed to flow over the screen. Separators of the screen-type generally involve a screen of a specified pore size that allows only solid particles smaller in size than the openings to pass through. Liquids pass through the screen while solids move down the face of the screen and accumulate at the bottom. The system has no moving parts, no power requirements (except for the pump), but is susceptible to clogging and therefore requires diligent maintenance. A vibrating screen consists of a flat circular screen that vibrates. Liquid sluices through the screen while solids that remain on the screen are slowly vibrated to the edges of the screen where they are collected. This system is semi self-cleaning but requires power. A rotating screen consists of a horizontal rotating perforated drum. Slurry is applied at the top of unit as the drum is spinning. Liquids pass through the holes in the drum while retained solids are scrapped into a collection area. This design is the most efficient with respect to keeping the screen holes open. Screens typically only achieve solids fractions with moisture contents between 85 to 95%.

A refinement of the continuously turning or rotating screen is the in-channel flighted conveyor screen. The in-channel flighted conveyor screen separator system consists of an inclined screen and a series of horizontal bars, called flighted conveyors. The in-channel flighted conveyor screen can be placed directly in an open manure channel. Such a placement eliminates the need for a sump or a pit and a lift pump. Liquid passes through the screen and drains into the channel on the downstream side of the separator, while the separated solids are deposited on a collection pad. Uses are similar to those of the stationary inclined screen separators, but the in-channel flighted conveyor screen separator requires more mechanical maintenance, as its moving parts are exposed to the corrosive and abrasive constituents of the liquid manure.

A second family of primary separators 20 that may be efficiently employed are known alternately as filters and presses. Filter and press systems press solids with rollers or screws against an opposing screen or belt and typically achieve a higher level of dewatering than screens alone. The three main types are the roller press, the belt press and the screw press. A roller press uses two concave screens and a series of brushes or rollers to squeeze the liquid through the screen. A belt press uses a flat woven fabric that runs horizontally between squeezing rollers. The screw press system consists of a large screw which forces the slurry through a tube and past a cylindrical screen. A plug of manure is formed at the end of the tube. The flow of solids out of the tube is controlled by a set of pressure plates.

Alternately, a plate press may be employed as a primary separator 20. A plate press relies upon plates position to exploit measured gaps between the plates, rather than pores, to separate solids from a flow of liquid. In another embodiment, filter press used as a primary separator 20 exploits a filter of defined porosity. As in any of these embodiments, smaller particles remain entrained in the liquid flow and larger particles are diverted by the press. Any of these primary separators 20 generally works best with manure having a solids content of less than 5%.

A dewatering screw press is still another example of a primary separator 20. The dewatering screw press includes a screened-cylinder; the dewatering screw accomplishes dewatering by continuous gravitational drainage as the slurry is conveyed through the cylinder. The most common form of a screw press is a design said to have been invented by famous Greek mathematician Archimedes and is known as the screw conveyor. The screw conveyor employs a shaft surrounded by a steel plate configured to form a helical spiral, which when rotated, motivate solids along the cylindrical screen. Gravity presses water through perforations in the wall. As in the case of each of the exemplary primary separators 20 discussed above, a liquid fraction as is removed in the screw press is exploited as a source of nutrients to be concentrated in the MVR 30. A solid fraction is conveyed through the screen cylinder are collected as reclaimed solids 23. Alternatively, the solid fraction is dried by means of a dryer 40 and composted as discussed below.

Some of the solids collected at primary separation may be used for feedstock for the composter and are collected for that purpose. While straw and other highly fibrous organic solids tend to be extremely difficult to compost, there remains a great volume of organic solids that can be advantageously retained for composting and the method collects these organic solids for later reintroduction into the compounded fertilizer as retained solids 23.

The collection and segregation of straw and highly fibrous solids presents an opportunity for economic gain for the dairyman. For example, the Cornell Waste Management Institute urges the use of dried manure solids as bedding for dairy cattle. "Cornell Waste Management Institute (CWMI) contacted the farms that had been or were starting to use DMS [dried manure solids] as bedding and conducted research on those farms to determine the feasibility of using manure solids as dairy cow bedding . . . Using manure solids can provide an economic benefit without adversely affecting herd health." Thus, the separated solids may be segregated for use as bedding for cattle.

Another option is to provide those solids for gasification. Gasification is a process that converts fibrous cell wall materials and other organic materials into carbon monoxide, hydrogen and carbon dioxide. This is achieved by reacting the material at high temperatures (>700° C.), without combustion, with a controlled amount of oxygen and/or steam. The resulting gas mixture is called syngas (from synthesis gas) or producer gas and is itself a fuel. The same fuel can be used to power, among other things, the dryers 40 referred to herein for drying manure solids.

While some of the suspended organic solids and nearly all of the sand are removed by the optional sand lane 14, reception pit 16 and, where used, by the primary separator 20, further organic solids may, optionally, be removed from the liquid fraction emanating from the primary separator 20. A secondary separator 26, such as a centrifuge might remove further organic solids from the liquid fraction. A centrifuge is a device which employs a high rotational speed to separate components of different densities. The decanter is a type of centrifuge used for the separation of two or more phases of different specific gravity; in particular for the clarifying of liquids in which suspended solids are present. The separation of solids and liquids takes place within a cylindrical/conical rotating bowl, drawing the more dense organic solids through the heavy manure to accumulate on the periphery for removal from the resulting light manure. Where a centrifuge is used, the solid fraction retained through secondary separation 23 is highly compostable organic matter and is reintroduced as reclaimed solids 23 into the composter 120 as described below.

Where a centrifuge is exploited as a secondary separator 26, two types of centrifuge, centrisieves and decanters, are particularly to remove the least dense of the organic solids. Centrisieves consist of an inclined revolving drum that is lined with a filter cloth. The slurry to be separated is pumped into the drum center. The liquid leaves the drum through the filter cloth and the organic solids move by centrifugal force to the edge of the drum where they are removed separately. In the case of decanter centrifuges, an auger, turning at a slightly higher speed than the cylinder in which it is contained, moves the slurry to a conic part of the vessel, where it is discharged. While an initially high capital investment and while the energy requirement is also quite high in comparison to other systems, the decanter centrifuge, however, is considered as quite efficient and has earned its place as the workhorse of a wide range of liquid/solid separation activities. Its application to the dewatering of manure has made it a most valuable tool in animal husbandry.

A low temperature dryer 40 is used to make the product easier to handle. The type of dryer 40 can be selected from a number of available devices. The specific dryer 40 will be selected to use one of a variety of fuels or to exploit waste heat to perform the drying process. The dryer 40 in a preferred embodiment is a gas-powered dryer 40 where high moisture solids are drawn past radiant heaters on a motorized conveyor 42 allowing drying of the organic solids to a desired state of dryness. In a preferred embodiment, the dryer 40 will dry the solid fraction from about 70% moisture manure down to a usable range of between 0-40%. The art of drying organic solids is known and further explanation here is not necessary to those having skills in the art.

The liquid fraction previously separated from the organic constituents of the manure is received at the MVR 30. The MVR 30 allows the concentration of nutrients in one flow, termed herein "nutrient concentrate" and produces a second flow containing nearly pure water. As used herein, the MVR 30 is exploited as, essentially, an evaporative process driving off most of the water and dissolved ammonia while retaining the solid nutrients as a nutrient concentrate 36. Typically, an MVR 30 can concentrate manure by as much as 20:1. Because nitrogen leaves the MVR 30 as ammonia dissolved in water, all of the nitrogen can be recovered. In conventional separation, this nitrogen is driven off by volatilization at high heats.

Figure 3:
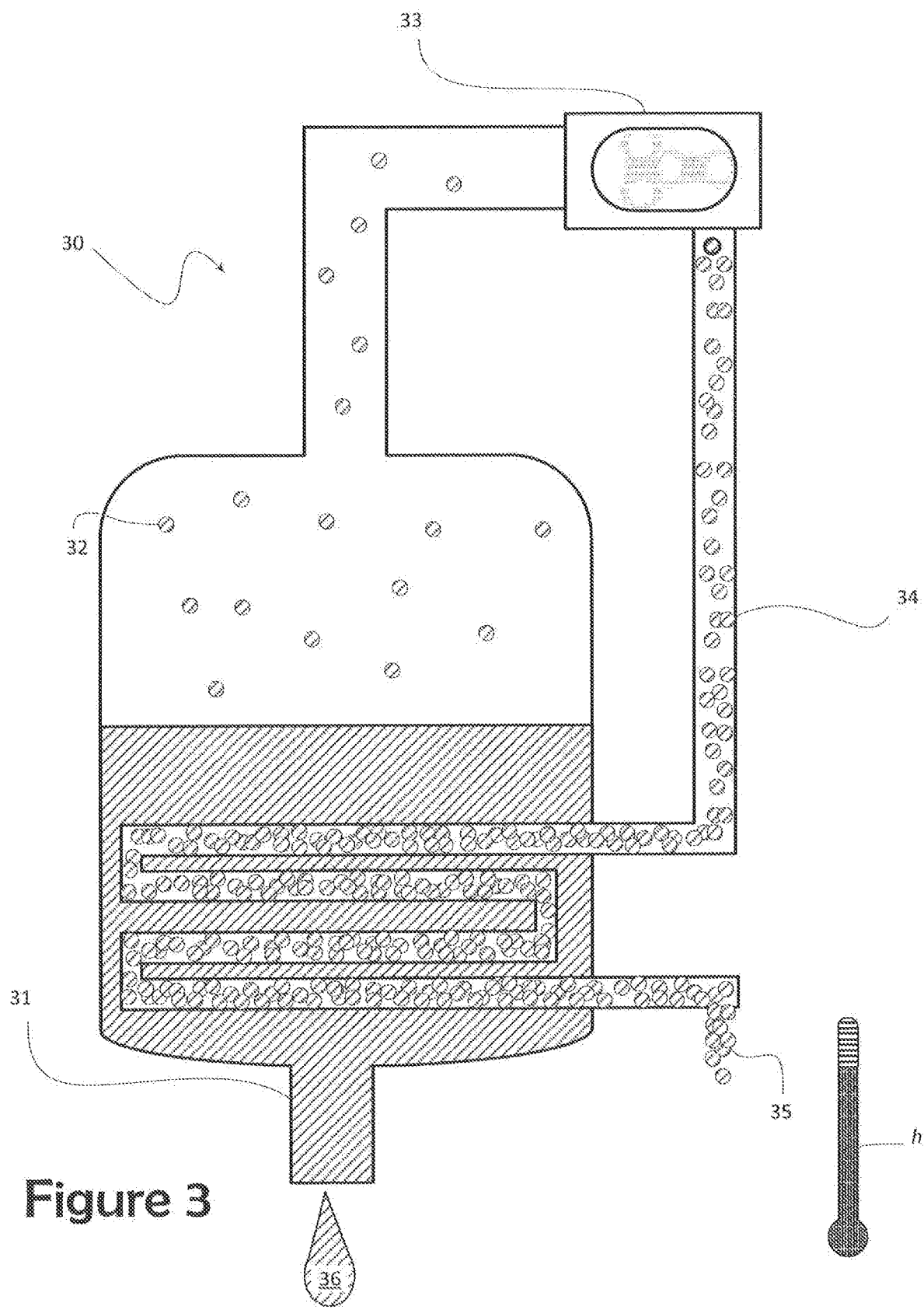
FIG. 3 depicts the operation of a mechanical vapor recompression evaporator ("MVR").

For a quick overview of evaporation, FIG. 3 presents the MVR 30. As practiced herein, the invention's mechanical vapor recompression in the MVR 30 is an energy recovery process. Liquid manure enters the MVR and pools as a liquid-phase slurry 31. What water exists in the slurry 31 which, at this point, has few solids suspended in it, is readily heated to evaporate water off as a vapor 32. Such evaporation is accelerated by heat escaping the recompressed vapor 34 through a heat exchanger (depicted as coils herein). In the presently preferred embodiment, that water vapor is produced at less than atmospheric pressure (allowing evaporation at lower temperatures), driving off a significant portion of the contained water thereby concentrating the nutrients significantly. (In a preferred embodiment, the pressure over the slurry is maintained at least 12 inches mercury (Hg) below atmospheric pressure, though a higher vacuum could be used successfully or might be used to initiate the process and then to run at 12 inches of Hg.) The system exploits the vapor pressure of the contained water to rapidly evaporate that contained water.

Vapor pressure or equilibrium vapor pressure is defined as the pressure exerted by a vapor in thermodynamic equilibrium with its condensed phases (solid or liquid) at a given temperature in a closed system. The equilibrium vapor pressure is an indication of a liquid's evaporation rate, in this case that of water. By confining the slurry 31 at these low pressures, the water vapor 32 readily leaves the slurry 31. The mechanical compressor 33 draws away this vapor 32 on its intake side, advantageously, maintaining the relatively low pressure in the vessel of the MVR 30.

The vapor 32 is then compressed by a mechanical means. A compressor 33 (in a presently preferred embodiment by a roots-type compressor) by compression adds energy to the vapor 32. This added energy is carried as heat h in the compressed vapor 34. The now smaller volume of vapor, the compressed vapor 34 has been driven to a higher temperature and pressure, thus, a higher energy state. Since the pressure increase of the vapor also generates an increase in the condensation temperature, the same vapor then serves as the heating medium for its "mother" liquid, i.e. the liquid manure slurry 31 being concentrated. As described above, energy escaping the compressed vapor 34 heats the slurry 31 to liberate the vapor 32.

It is instructive to look at this transfer of energy from the compressed vapor 34 to the slurry 31. Commonly called a heat exchanger, the coils that contain the compressed vapor 34 hold that vapor 34 in thermal proximity to the slurry 31. Energy migrates as heat, to the mother liquid, the slurry 31. A heat exchanger is a device designed to efficiently transfer or "exchange" heat from one matter to another.

Operation of the evaporative MVR 30 is as an open heat pump system. Through compression, both pressure and temperature increase, together with the corresponding saturation temperature. The required compression energy is very small compared to the amount of latent heat present in the recycled steam. As a result, pure water (containing dissolved ammonia gas) is evaporated off as water vapor 32 and leaves the slurry 31 to produce a highly concentrated soup of the nutrients the liquid manure contained, i.e. the nutrient concentrate 36.

To summarize the operation of the MVR 30, compression at the compressor simultaneously increases both the pressure and the temperature of the vapor 34 on the downstream side while dropping the pressure in the vessel to hasten the escape of water from the slurry 31 as vapor 32. Heat of compression is drawn off at a condenser from the vapor 34 to facilitate condensation of the nutrient concentrate in the slurry 31. The transfer of energy from the compressed vapor 34 causes ammonia laden water vapor that evaporated out of the slurry to then be condensed to ammonia-laden water 35 giving up heat to drive more water vapor off of its "mother fluid", the slurry 31. Importantly, because the slurry 31 and the compressed vapor 34 do not come in contact one with the other, the differences in pressure are of no consequence. The energy is transferred as a consequence of the temperature differences between the two fluids. Compression by the compressor 33 drives the vapor 34 to a high temperature and this high temperature transfers to walls of tubes in which the compressed vapor 34 is contained. These heated tubes, in turn, heat the slurry 31, driving off ammonia-laden water vapor 32 which is drawn into the compressor 33.

Advantageously, while some heat removed from the compressed vapor 34 heats the slurry 31, a great deal of heat h continues to reside in the ammonia-laden water 35 as it is drawn off from the vessel. This residual heat h keeps the condensate at an optimum temperature to facilitate removal of ammonia in ammonia stripping towers 37. The retention of this heat h provides a synergy with the operation of the ammonia stripping towers 37.

Other means may also be used to exploit process heat provided by the MVR 30. For example, in the operation of the ammonia stripping towers 37, rather than allowing heated air to escape from the stripping towers 37, air is retained and recycled as a closed loop of the air flow within the stripping towers 37. This recycling of air can be used to further conserve process heat. Also, a heat exchanger can be employed at the exit from the MVR 30 to draw more heat from the nutrient concentrate 36 as it is drawn from the vessel. Exploiting either of these methods can be used to maintain an optimum stripping temperature, contributing to efficient operation of the stripping towers 37. Because the MVR 30 is the source of the heat, these methods also exploit the synergy to be found in joint operation of the MVR 30 and the stripping towers 37.

Returning to FIG. 1, in the condensate 35 leaving the MVR 30 and entering the ammonia stripping towers 37, ammonium ions exist in equilibrium with ammonia gas. Ammonia exists in the condensate both as dissolved gas ($NH_3$) and in true solution as an ion ($NH_4^+$). The ammonia stripping towers 37 provide an environment in which to shift the conditions of heat, acidity, and pressure to create an selected equilibrium within the tower, an equilibrium to favor the liberation of ammonia as a gas. Thus, because the condensate 35 can be maintained at the elevated temperature leaving the MVR 30, the chemical equilibrium can be shifted to favor formation of ammonia gas formation within the first of the stripping towers 37.

There are generally two towers used in conjunction to form the stripping towers 37. In the presently preferred embodiment, air is forced through the first of the stripping towers 37 to harvest the liberated ammonia gas, entraining it and carrying the ammonia gas to the second of the stripping towers 37 where ammonia gas is removed as ammonia sulfate. Pure water droplets pool at the base of the first of the stripping towers 37, which is drawn off and is stored in a reservoir such as a storage lagoon 38 (FIG. 1) for use as clean water in the dairy 12. Meanwhile, the air carries the entrained ammonia gas into the second of the stripping towers for chemical reaction there, in the preferred embodiment. The second of the stripping towers 37 serves an absorber capturing the gaseous ammonia as ammonium sulfate. Ammonia gas meets a mist of sulfuric acid which, by chemical reaction, precipitates ammonium sulfate (a valued nitrogen-laden fertilizer). Still bearing a great deal of process heat h, with the ammonia removed, this flow of clean air runs back to the first of the stripping towers 37, there to entrain more ammonia gas.

Ammonia stripping occurs at the surface of the condensed water vapor 35. The surface of the condensate 35 is the interface between water and air and ammonia gas leaves through that surface. The condensate 35 is sprayed into a forced air flow within the first of the stripping towers 37. To enhance the volume of gas escaping, the first of the ammonia stripping towers includes structures in the form of internal packing break up the sprayed condensate 35 into fine droplets. Breaking the condensate 35 into droplets gives the ammonia more opportunities to escape. (The smaller the droplet of water, the greater the ratio between the surface area and the volume of the droplet.)

Because the surface tension at the air-water interface is at a minimum when the water droplets or surface films are being formed, the transfer of dissolved gas from the liquid to gas entrained in the air flow is at a maximum at this instant. The greater the heat h the droplets contain, the greater the energy of the dissolved gas as it strikes the surface from the interior of the water droplet. Then, much as a rocket escapes the gravitational pull of earth, the gas molecule escapes the condensate 35 to be entrained in the air flow.

In the preferred embodiment, distinct towers are employed for the separate actions of liberating the ammonia gas from the condensate and the precipitation of the ammonia gas as ammonium sulfate. Because these two actions could be performed in a single structure and because the flow of air is most advantageous when the two actions are performed in close proximity one to the other, the inventors have expressed the ammonia stripping towers 37 as a monolithic element of the invention even though they will be configured as separate chambers within the monolith. Thus, in the preferred embodiment a first and a second stripping tower, both expressed as the towers 37 are used to reclaim the ammonia from the condensate 35.

As stated above, the output of the second of the stripping towers 37 is ammonium sulfate. The primary use of precipitated ammonium sulfate is as a fertilizer for alkaline soils. In the soil the ammonium ion is released and the sulfate ion forms a small amount of acid, lowering the pH balance of the soil, while in the same reaction, released nitrogen ions contribute with a 21-0-0 analysis, ammonium sulfate is one of agriculture's oldest solid forms of fertilizer. Ammonium Sulfate is a quick acting form of water soluble nitrogen that stimulates vegetative growth and produces deep green color. Additionally, ammonium sulfate as it reacts with the soil, liberates high volumes of sulfur to enhance decomposition of thatch within the soil. Sulfur available within the thatch stimulates growth of microorganisms enhancing decomposition. Decomposition of the vegetable matter liberates other nutrients to fertilize crops along with the nitrogen from the ammonia, thereby improving color and density of, for example, turf. Also, in addition to being nitrogen-rich, ammonia will reduce the amount of acid present in the decomposing thatch and, at the more neutral acidity, enhance the action of composting organisms (referred to collectively, herein, as "aerobic thermophilic microorganisms" or "ATM") 130. Ammonium sulfate can be selectively added to the feedstock of the composter 130 (FIG. 2) to accelerate decomposition therein.

The major microbiological components of compost are bacteria and fungi. In addition, actinomycetes, while a particular type of bacteria, are considered as the third major component for their ability to degrade the more recalcitrant compounds. The microorganisms needed for composting are found naturally in the output of the MVR 30, i.e. dried nutrients 50, and remain viable because of the low temperatures employed in evaporation. Viable, as used here, means to maintain and multiply an active microbial population during composting. In addition, considerable research has focused on enhancing organic decomposition achieved by inoculating composting vegetable matter with specific microorganisms to increase the microbial population. Having greater numbers of microbes acting on the composts enhances the instances of conversion of organics and reduces odorous gas emissions during composting.

Figure 2:
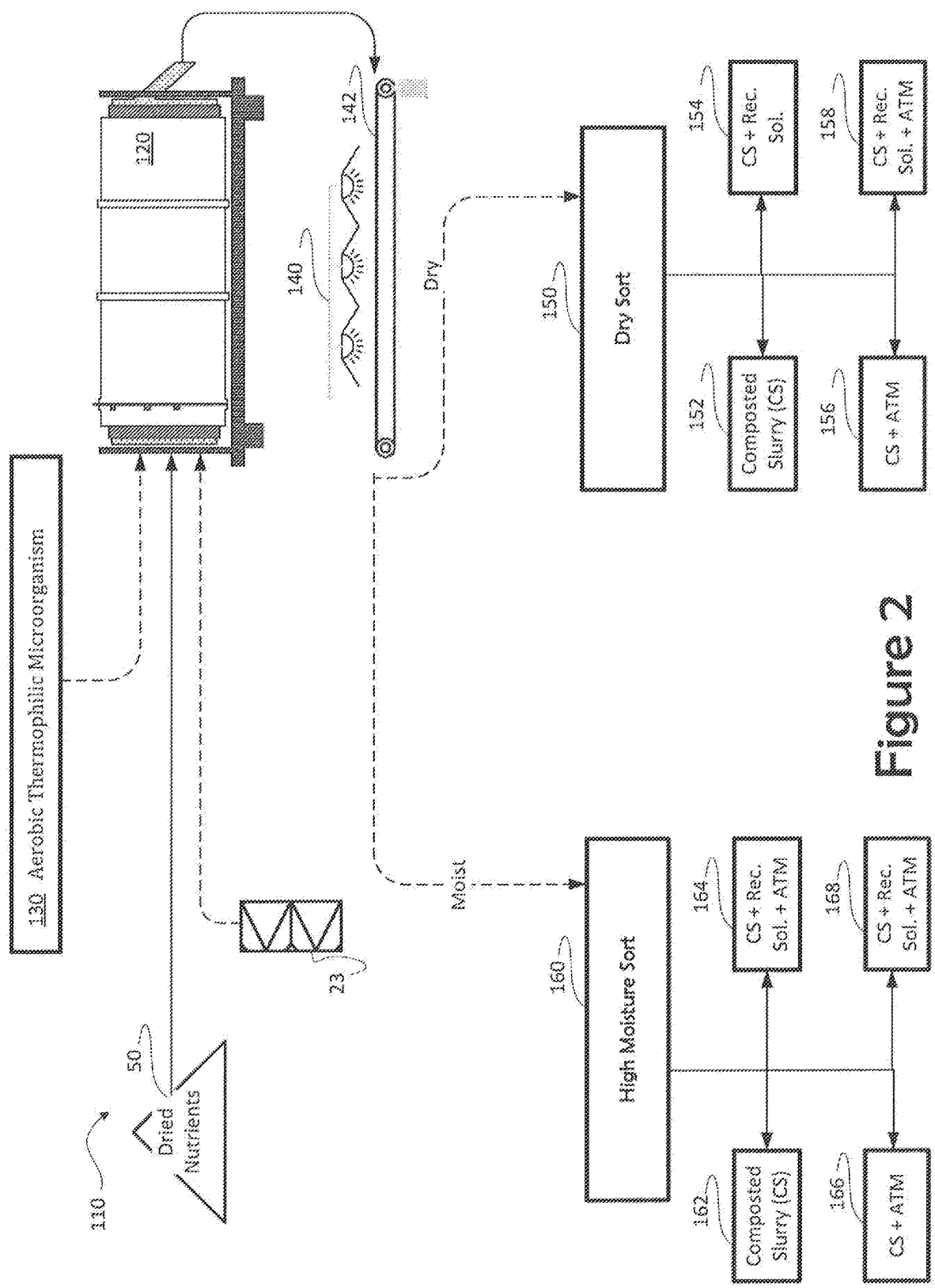
FIG. 2 depicts a method and system for composting and compounding organic solids, nutrient concentrate and aerobic thermophilic microorganisms in various proportions to produce fertilizer.

As the discussion leaves FIG. 1 in favor of FIG. 2, it is important to note that in transition there are three intermediate products the system 10 and method has produced: 1) reclaimed solids 23 at a selected state of dryness, i.e. either wet or dry as needed; 2) a supply of dried nutrients in a thickened broth-like liquid; and 3) ATM 130 to decompose the organics in composting. These three constituents can be compounded to produce superior fertilizer in either of dry or wet form and according to desired chemical levels. As discussed above, reclaimed solids 23 are may added as an amendment to improve the tilth structure of soil. FIG. 2 is provided to demonstrate a composting system 110 to exploit these three products of the system 10 and method demonstrated in FIG. 1. Thus, the compounding system 110 shown in FIG. 2 presents the formulation of fertilizer from these three manure constituents.

While the composting of organic solids is not a necessary step in the instant inventive system and method, the benefit of composting of organic solids is widely known. Composting is selected to be included in the preferred embodiment of the invention to exploit the products of the system 10 in a highly bioavailable state. Importantly, any mixing of the constituent portions of reclaimed solids 23, dried nutrients 50 and ATM 130, even to the exclusion of one or another of the constituents, might occur using any mixing facility. Nonetheless, composting is the preferred method and presented, here, in the preferred embodiment of the invention. All the discussion herein relating to the mixing of the constituents to form fertilizer will be presented in the nonlimiting exemplary context of composting. Again, however, the invention may be practiced without such composting, substituting the mere act of mixing and blending of selected quantities of two or three of the constituents.

In a further and optional embodiment, ammonium sulfate, precipitated in the stripping towers 37, may be added to enhance nitrogen content in the compost and to further facilitate the rapid decomposition of included organic solids, where present. The selective addition of ammonium sulfate results in the shifting the analysis composition of the resulting fertilizer. Thus, by selective combination of the several constituents recovered prior to composting, "designer" organic fertilizer emerges, compounded within the composter.

In reducing the invention to practice, the inventors have found that the Daritech® BeddingMaster® has been advantageously employed as an in-vessel composter 120 to compost organic matter and well configured to receive the inoculation of aerobic thermophilic microorganisms ("ATM") 130 to further facilitate biological decomposition of the organic matter within the dried nutrients 50. This is not to say that other available composting mechanisms would not serve the ends of the invention, formulating fertilizer from the constituent parts, i.e. reclaimed solids 23, dried nutrients 50, and ATM 130, but rather to assert that the BeddingMaster® has proven to be a suitable mechanism for such compounding, assuring appropriate results.

Generally speaking, the dried nutrients 50, in the system 10 as also shown in FIG. 1, have only been dried to a minimal degree to serve as feedstock for the composter 120. By way of nonlimiting example, the nutrient concentrate 36 is made up of nutrients and some organic manure solids of approximately 35% dry matter. Because the MVR 30 is the principal means of dewatering the nutrients, no significant amount of nitrogen volatilization occurs. In most instances, the dried nutrients 50 will retain the aerobic flora necessary to consume the organic matter when introduced into the composter 120. Once inside the composter 120, those flora (many of the same as those in the ATM 130) proliferate as they finish the job begun in the cows' stomachs. During composting, a blower pulls air through the drum, ensuring an ample air supply. This supplied air mixes with the solids that are tumbling from the rotation of the drum allowing respiration. Within just a few hours, the activity of the bacteria will bring the temperature to over 150° F. where it stays as the material moves through the composter 120.

In movement of dried nutrients 50 through the composter, a greater population of these same microbes can accelerate and enhance composting. Also, the population of these microbes can encourage further decomposition of organic matter in soil, when the composted product is applied. By inoculation from a reservoir of ATM 130 prior to composting, a more valuable product emerges as the composter output have an enhanced population of ATM microbes as well as a supply of organic solids that are more completely digested and can supplement tilth structure in soil. To secure this beneficial enhancement of native soil, an ATM inoculation 130 is provided for this optional addition to the dried nutrients 50.

Feedstock to the composter 120 comprises dried nutrients 50. Additionally, dried organics in the form of the earlier-described reclaimed solids 23 may be introduced to enhance the mixture in selected proportions. As described above, ATM 130 can also be added in selected proportions to achieve a selected mixture. Importantly, as noted above, the combinations of these three can be varied, even to the exclusion of one or another in order to provide distinct products. By varying proportions of the constituents (dried nutrients 50; reclaimed solids 23 and ATM 130) the composter 120 will produce distinct products and, as such, the output of the composter 120 can be readily predicted and identified.

As the composted product emerges from the composter (as discussed above), the drying of the product makes its handling and storage easier. Generally speaking, the agricultural industry has channeled its demand for fertilizer into two levels of dryness described generally as "moist" and "dry." Moist fertilizer has a solids content ranging from 40-70% and may be alternately described as "high moisture content" fertilizer. A second category is referred to as "dry" and is generally categorized as about 85% solids or greater.

Moist fertilizer is preferred when the product is to be used near the dairy. The benefits of drying manure include imparting a greater ease in handling and transportation of the resulting fertilizer. However, because of nutrient volatilization under heat and the cost of energy to run a dryer 140, the moist fertilizer is generally economically desirable over dry fertilizer where transportation is minimal or storage is not required. As transportation costs mount or where extended storage is desired, for example, for sites further removed from the dairy, the slight degradation of nutrients due to drying is not a significant enough factor to overwhelm the ease of handling or transportation. Thus, state of dryness is selected to meet the needs of the ultimate user. In accord with the customs of the industry, product is sorted to either of a dry moisture sort 150 or a high moisture sort 160.

As discussed above, the composted product can include any combination of additional constituents (dried nutrients 50; reclaimed solids 23 and ATM 130) added to the feedstock in order to produce distinct products. Where no additional constituents are added, the concentrated nutrients from the slurry, i.e. the dried nutrients 50, are composted and dried produce either of a dry composted fertilizer 152 or wet composted fertilizer 162. Where additional organic content is desired, the reclaimed solids 23 are included in the composter 120 feedstock and yields greater volume of product as either dry fertilizer 154 or moist fertilizer 164. When these same dried nutrients 50 have been inoculated with ATM 130, the dry fertilizer 156 or the wet fertilizer 166 carry these ATM to enhance and decompose additional organics the soil contains. Finally, in accord with the needs of prospective customers, both the additional organics contained in the reclaimed solids 23 and the additional ATM to break down those additional reclaimed solids 23 yields an enhance fertilizer product in either of dry 158 or moist formulation. Each of these products has a separate market and production can be controlled by the selective addition of constituents to the composter feedstock.

So, once feedstock constituents are selected to produce a needed fertilizer profile, the desired product or products emerge from composter 120 for drying on the conveyor 142 under the dryer 140. As expressed above, drying may be achieved under any suitable dryer 142, though in the presently preferred embodiment, the dryer 142 is powered by gas. In such a manner, product that emerges is made-to-order from constituents produced at the dairy 12 site. Because manure is a necessary by-product of the dairy operation, the use of the MVR 30 evaporator in thermal conjunction with the Ammonia Stripping Towers 37 facilitates the dairyman's economic exploitation of these manure by-products.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system to produce fertilizer from manure, the system comprising:
   a heat exchanger configured to extract heat from compressed ammonia-laden water vapor received on a second side to impart heat to a manure slurry received on a first side thereby to evaporate ammonia-laden water vapor from the slurry, leaving a nutrient concentrate, the second side of the heat exchanger configured to cool, by transferring energy to heat the manure slurry in the first side, the ammonia-laden water vapor giving up its energy as heat through a phase change to ammonia-laden water leaving the second side at a process temperature;
   a compressor to receive the evaporated ammonia-laden water vapor from the second side of the heat exchanger, compressing the evaporated ammonia-laden water vapor to raise its energy state and to feed it into the first side of the heat exchanger;

a reservoir for collecting the nutrient concentrate from the first side of the heat exchanger, thereby, segregating the nutrient concentrate from the manure slurry; and an in-vessel composter for receiving the nutrient concentrate drawn from the reservoir as feedstock for composting therein.

2. The system of claim 1, wherein in-vessel composter includes a manifold for receiving at least one constituent, the constituents comprising:

aerobic thermophilic microorganisms inoculating the feedstock; and retained organic solids for augmenting the feedstock.

3. The system of claim 1, further comprising:

a dryer for drying the nutrient concentrate to a fertilizer product, the degree of drying being selected to contain a proportion of solids in a range selected from a pair of ranges consisting of:

"moist" having a solids content of between 30% to 70%; and

"dry" having a solids content in excess of "moist".

4. The system of claim 1, including a primary separator configured to separate manure into each of a solid fraction and a liquid fraction, including a liquid fraction conduit to convey the liquid fraction to the first side of the heat exchanger to join the manure slurry, the primary separator being selected from a group consisting of:

screen separators;

filters; and presses configured to dewater manure slurry.

5. The system of claim 4, wherein the solid fraction from the primary separator is retained as organic solids.

6. The system of claim 1, further comprising a secondary separator including a centrifuge to separate a secondary liquid fraction from a secondary solid fraction, the system to include a secondary liquid fraction conduit to convey the secondary liquid fraction to the first side of the heat exchanger to join the manure slurry.

7. The system of claim 6, wherein the solid fraction from the secondary separator is retained as organic solids.

8. A system for converting manure to fertilizer, the system comprising:

a mechanical vapor recompression evaporator ("MVR") for receiving a manure slurry, the MVR configured to separate ammonia-laden water as condensate from the manure slurry, yielding a nutrient concentrate, the condensate leaving the MVR at a selected process temperature;

an in-vessel composter to receive and compost the nutrient concentrate from the MVR;

an ammonia stripping tower to receive the ammonia-laden water, the ammonia stripping tower comprising a flow of air to liberate ammonia gas from the ammonia-laden water, the ammonia gas being entrained in the flow of air to be conveyed out of the ammonia stripping tower;

a buffering tower comprising a mist of sulfuric acid, the mist configured to intercept the flow of air, thereby to facilitate a chemical reaction precipitating the ammonia gas as ammonium sulfate from the flow of air.

9. The system of claim 8, further comprising a primary separator configured to separate manure into each of a solid fraction and a liquid fraction, the liquid fraction being conveyed to the MVR to join the manure slurry, the primary separator being selected from a group consisting of:

screen separators;

filters; and presses configured to dewater manure slurry.

10. The system of claim 8, further comprising a secondary separator comprising a centrifuge to separate a secondary liquid fraction and a secondary solid fraction, the secondary liquid fraction being conveyed to the MVR to join the manure slurry.

* * * * *